(12) United States Patent
Reames et al.

(10) Patent No.: US 6,228,290 B1
(45) Date of Patent: May 8, 2001

(54) METHOD OF MANUFACTURING AN ENCAPSULATED, DUAL LENS, SEALED INSTRUMENT COVER

(75) Inventors: Gary Reames, Muskegon; Bob Herrmann, Spring Lake; Howard Daley, Zeeland; Ron Peel, North Muskegon, all of MI (US)

(73) Assignee: Gemtron Corporation, Sweetwater, TN (US)

( * ) Notice: Subject to any disclaimer, the term of this patent is extended or adjusted under 35 U.S.C. 154(b) by 0 days.

(21) Appl. No.: 09/358,641

(22) Filed: Jul. 23, 1999

(51) Int. Cl.$^7$ .......................... B29C 45/14; B29C 45/16; B29D 11/00
(52) U.S. Cl. .................. 264/1.7; 52/786.1; 156/107; 156/109; 264/252; 264/261; 264/263; 264/328.7; 264/328.8; 428/34; 428/194
(58) Field of Search .................. 264/1.1, 1.7, 1.9, 264/252, 261, 263, 277, 328.7, 328.8; 156/109, 107; 428/34, 194, 210, 38; 52/171.3, 172, 786.1, 786.13

(56) References Cited

U.S. PATENT DOCUMENTS

| | | | |
|---|---|---|---|
| 3,971,841 | 7/1976 | Rubinstein . | |
| 4,909,875 | * 3/1990 | Canaud et al. | 156/109 |
| 4,951,927 | * 8/1990 | Johnston et al. | 264/252 |
| 5,073,324 | * 12/1991 | Beaudet | 264/1.7 |
| 5,344,603 | * 9/1994 | Jardin et al. | 264/261 |
| 5,997,793 | * 12/1999 | Lahnala | 264/261 |

\* cited by examiner

Primary Examiner—Mathieu D. Vargot
(74) Attorney, Agent, or Firm—Diller, Ramik & Wight

(57) ABSTRACT

An article of manufacture, such as an encapsulated dual lens sealed instrument cover, includes four components, namely, a first lens having a peripheral edge encapsulated by a polymeric/polymeric injection molded encapsulation or border and a second lens also have a peripheral edge encapsulated by a second injection molded polymeric/copolymeric encapsulation or border. A hermetic chamber is thereby formed between the two lenses. The first encapsulation is also provided with threads or similar fastening means to readily secure the instrument cover to an instrument "can" containing any variety of instruments, such as a nautical compass, amperage/voltage, fuel, etc. The first lens is inserted into a cavity of a mold and the first encapsulation is injection molded thereabout. The latter two components are then assembled with respect to the second lens and the second encapsulation is injection molded thereabout. This double injection molding process to manufacture the dual lens sealed instrument cover creates "anti-fog" characteristics and allows more rapid and cost-effective manufacturing than heretofore provided by conventional techniques utilizing metal crimping and sealing techniques.

64 Claims, 5 Drawing Sheets

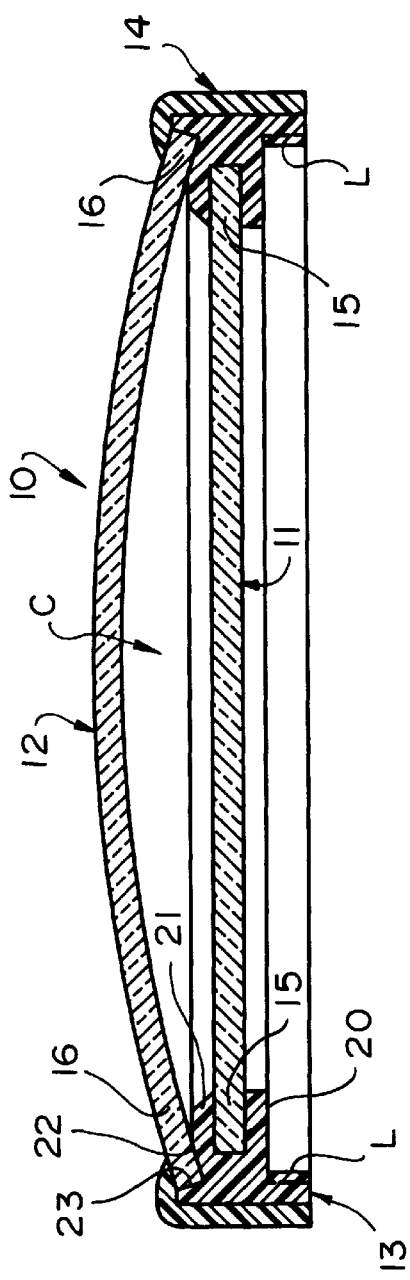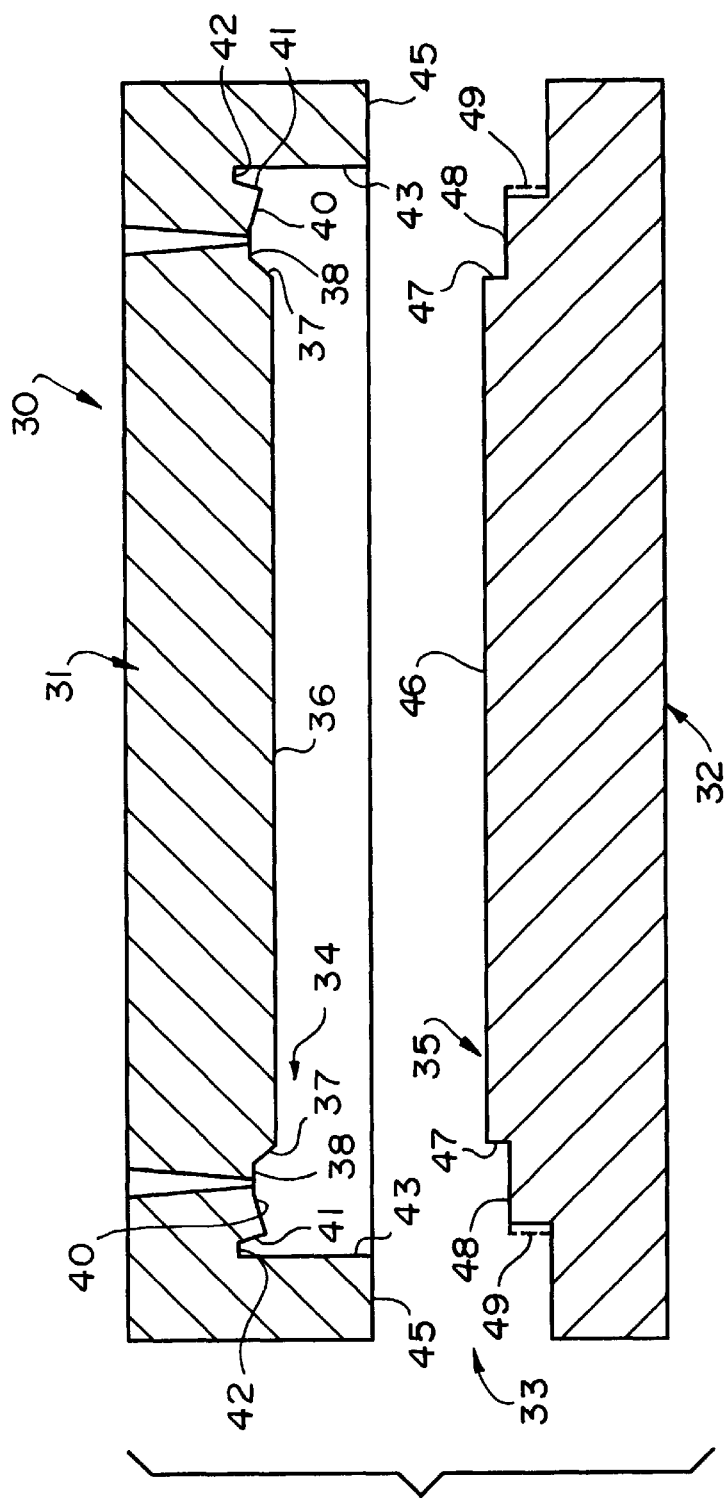
FIG. 1
FIG. 2

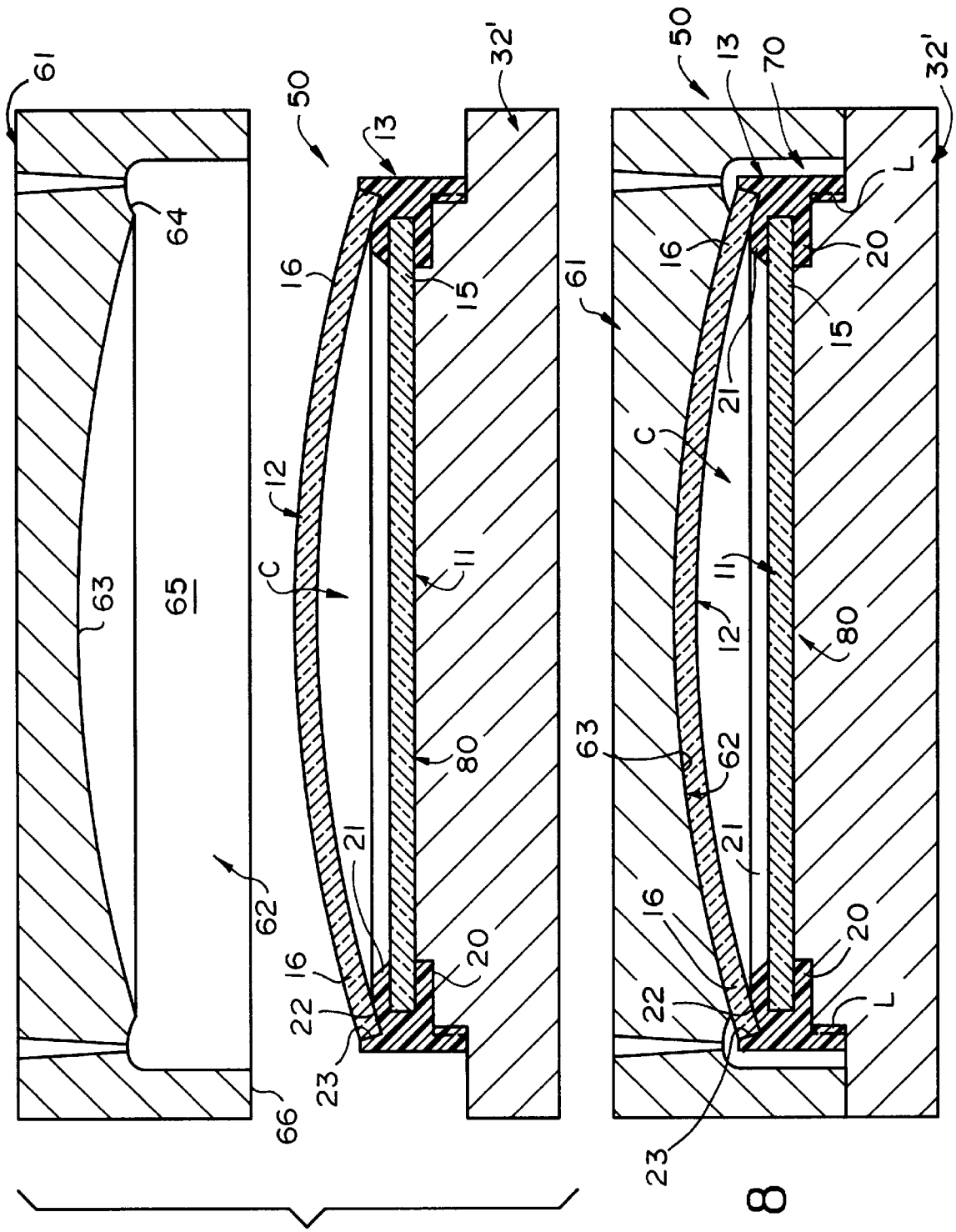

METHOD OF MANUFACTURING AN ENCAPSULATED, DUAL LENS, SEALED INSTRUMENT COVER

BACKGROUND OF THE INVENTION

Heretofore it has been common to house instrumentation in an instrument "can" which is closed by a bezel threaded to an upper threaded end of the instrument can. The bezel normally includes a transparent plastic sheet or panel bounded by a metallic rim, and it is through the transparent plastic panel that an instrument face of the instrument housed in the instrument can is viewed. Multiple spaced transparent plastic or glass panels, sheets or lens can be associated with a rim in an effort to create an "anti-fog" lens. Normally, these "stacks" utilize seals, adhesives and/or crimped metal between the rim and the transparent lens to create a chamber between the lens which is hermetically sealed against ambient moisture and fog, though most instrument covers thus manufactured fall short of this objective. Most conventional instrument covers do not use glass for the lens due to assembly problems and costs associated with the top or outermost lens falling out, cracking or otherwise being damaged. Thus, though glass lenses are highly coveted for instrument covers, the problems associated with assembly and repair dictate the utilization of transparent plastic for both the outer and inner lens of the instrument cover.

SUMMARY OF THE INVENTION

In keeping with the foregoing, the primary object of the present invention is to provide a novel method of manufacturing an encapsulated, dual lens, sealed instrument cover by encapsulating a peripheral edge of a first piece of glass with synthetic polymeric/copolymeric material, preferably by injection molding in a first mold, removing the first piece of glass and the first encapsulation from the mold, inserting the latter in a second mold, assembling a second piece of glass in association with the first encapsulation, and injection molding a second peripheral encapsulation which unites the second glass lens to the first encapsulation in hermetic sealed relationship thereto, thus creating an anti-fog chamber between the two glass lenses.

In further accordance with the invention, the first injection molded encapsulation or border is provided with threads or similar conventional means for removably securing the lens cover to an associated instrument can.

Though the method just described is utilized for manufacturing an encapsulated, dual lens, sealed instrument cover, the present invention is particularly useful for manufacturing any product requiring the peripheral encapsulation of two pieces of glass, plastic or other material for a number of end use applications, such as windows and doors possessing increased thermal efficiency due to the sealed chamber between the glass panels. In such cases the chamber can be evacuated and/or charged with inert gas incident to the peripheral encapsulation of the second glass panel to the first encapsulation or border. Oven doors, microwave oven doors, computer screens, ski goggles, protective goggles, and many other end use products requiring two sheets of spaced glass or plastic peripherally sealed together can be economically, rapidly and efficiently manufactured in accordance with the present method.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a cross-sectional view through an encapsulated, dual lens, sealed instrument cover or like article manufactured in accordance with this invention, and illustrates a first uni-planar sheet of glass having a periphery bordered by a first encapsulation and a second concavo-convex sheet of glass having a peripheral edge encapsulated by a second encapsulation with the two encapsulations being bonded in sealed relationship to each other and effecting a seal between the two glass sheets, plates or lenses and a chamber therebetween.

FIG. 2 is a vertical cross-sectional view taken through an injection mold of the present invention, and illustrates upper and upper and lower mold bodies in their open position with each defining a cavity portion which in the closed position of the mold defines a mold cavity for forming the first encapsulation, border or frame of the instrument cover of FIG. 1.

FIG. 7 is a vertical cross-sectional view taken through the injection mold of FIG. 6, and illustrates a second concavo-convex piece of glass positioned with a peripheral edge thereof seated upon a peripheral seat of the first encapsulation incident to the closing of the second mold bodies.

FIG. 8 is a vertical cross-sectional view of the second injection mold, and illustrates the closed position thereof defining a second peripheral mold cavity.

DESCRIPTION OF THE PREFERRED EMBODIMENT

Figure 3:
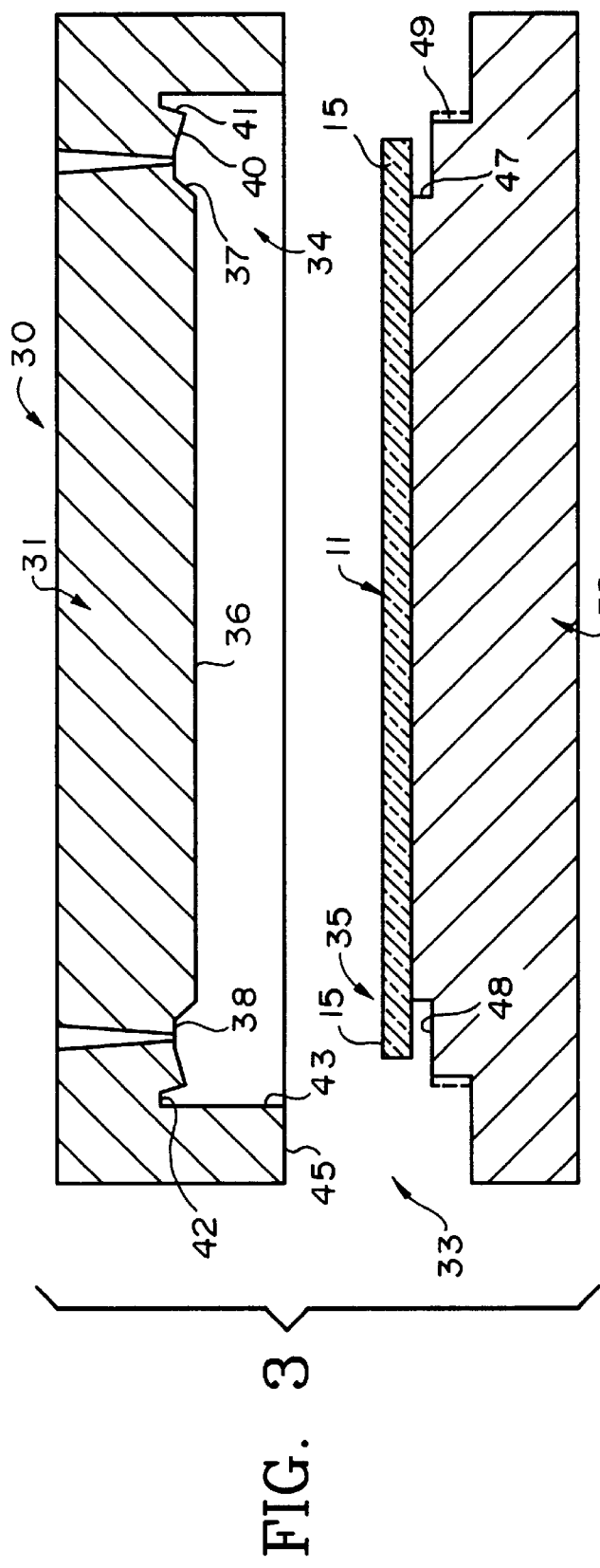
FIG. 3 is a vertical cross-sectional view taken through the mold of FIG. 2, and illustrates the first uni-planar piece of glass or lens positioned upon the lower mold body incident to the closing of the mold bodies.

An article of manufacture, such as an encapsulated, dual lens, sealed instrument cover, is illustrated in FIG. 1 of the drawings, and is generally designated by the reference numeral 10.

The article of manufacture 10 includes at least four components, namely, a first component 11, a second component 12, a third component 13 and a fourth component 14.

The components 11, 12 are preferably transparent glass sheets or lens of generally circular configuration, though the components 11, 12 can be made of transparent plastic or similar polymeric/copolymeric synthetic plastic material. The first component 11 is generally uni-planar, whereas the second component 12 is of a concavo-convex configuration, and the first and second components 11, 12, respectively, each include respective peripheral edges 15, 16. The peripheral edge 15 of the glass sheet or lens 11 is in sealed encapsulated relationship to the third component 13 which is an injection molded encapsulation, border or frame. The peripheral edge 16 of the second glass sheet or lens 12 is similarly encapsulated by the fourth component 14 which is an injection molded polymeric/copolymeric peripheral encapsulation, border or frame. A space or chamber C is defined between the components 11 through 13, and due to the hermetic seal therebetween, the interior of the chamber C is entirely sealed from exterior ambient atmosphere (moisture, water and/or dirt or like contaminants), and thus specifically precludes fogging of the lenses 11 and/or 12.

The article 10 of FIG. 1 is formed by a two-step injection molding process utilizing a first injection mold 30 (FIGS. 2 through 5) and a second injection mold 50 (FIGS. 6 through 9).

The first injection mold 30 (FIG. 2) includes an upper mold body 31 and a lower mold body 32 which collectively define a mold cavity 33 when the mold bodies 31, 32 are closed in a conventional manner. Injection ports, sprues, runners, etc. for injecting polymeric/copolymeric plastic material into the cavity 33 are all conventional and are not shown in FIGS. 2 through 5 of the drawings.

The mold cavity 33 of the first mold 30 includes respective upper and lower cavity portions 34, 35, respectively.

The upper cavity portion 34 of the mold cavity 35 is defined by a central circular uni-planar surface 36 (FIGS. 2 and 3), an inboard frusto-conical surface 37, an annular surface 38 lying in a plane parallel to, but axially spaced from, the plane of the central circular surface 36, an intermediate frusto-conical surface 40, an outermost frusto-conical surface 41, an uppermost annular surface 42 and a cylindrical outermost surface 43 which merges with an annular parting surface 45.

Figure 4:
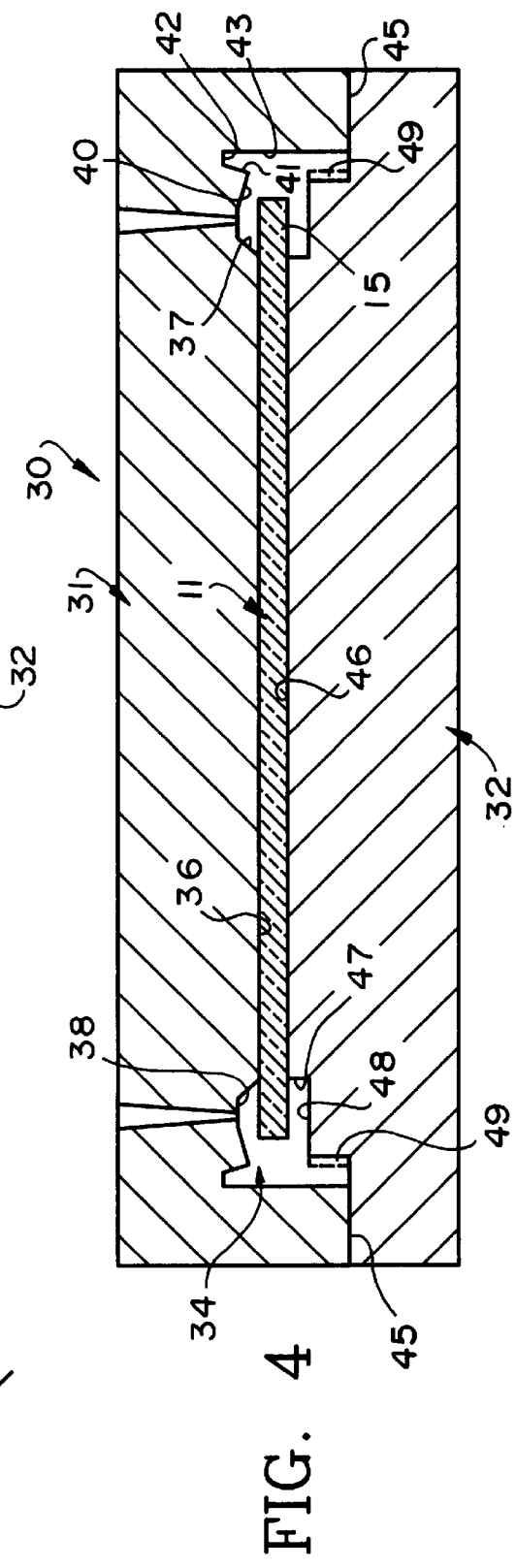
FIG. 4 is a vertical cross-sectional view of the mold of FIGS. 2 and 3, and illustrates the mold in its closed position and a peripheral cavity defined thereby into which projects a peripheral edge of the first uni-planar glass sheet.

The cavity portion 35 is defined by a central circular uni-planar surface 46 (FIGS. 2 and 3) in substantially spaced opposing relationship to the central circular uni-planar surface 36 of the cavity portion 34, an innermost peripheral surface 47, an annular surface 48, a peripheral surface 49 and a parting surface (unnumbered) which abuts the parting surface 45 of the upper mold body 31 when the upper and lower mold bodies 31, 32, respectively, are closed (FIG. 4). The peripheral surface 49 of the lower mold body 32 preferably includes a surface contour which forms diametrically opposite bayonet lugs/slots L or other conventional fastening means in upon the encapsulation 13 injection molded therein, as will be described more fully hereinafter. Alternately, the peripheral surface 49 can be designed to include diametrically opposite bayonet lugs/slots, preferably spaced 90 degrees from each other or conventional threads (not shown), but no matter the character of the peripheral surface 49, the function thereof is to permit the rapid attachment and detachment of the instrument cover 10 respectively to and from an associated instrument "can" (not shown) in a conventional manner. Though not illustrated, the lower mold body 32 can be formed as a multi-part or segmented mold body to permit its opening and retraction without deteriorating or damaging the lugs/slots L (FIG. 1), threads or the like as the mold bodies 31, 32 are opened in a conventional manner subsequent to the injection molding of the third component or first encapsulation 13 therein.

In the open position of the mold bodies 31, 32 (FIG. 2), the first component, glass lens or sheet 11 is seated atop and upon the central circular uni-planar surface 46 of the mold body 32 in the manner illustrated in FIG. 3 with the peripheral edge 15 projecting an equal radial distance beyond the peripheral surface 47. The mold bodies 31, 32 are closed in the manner illustrated in FIG. 4. In the closed position, the glass sheet 11 is clamped between surfaces 36, 46. Such closing techniques are conventional in the art, and suffice it to say that the mold bodies 31, 32 are brought to the closed position of FIG. 4 such that a peripheral portion of the cavity 33 is in part set off and defined by the peripheral edge 15 of the glass sheet 11 projecting therein, as is clearly illustrated in FIG. 4.

Figure 5:
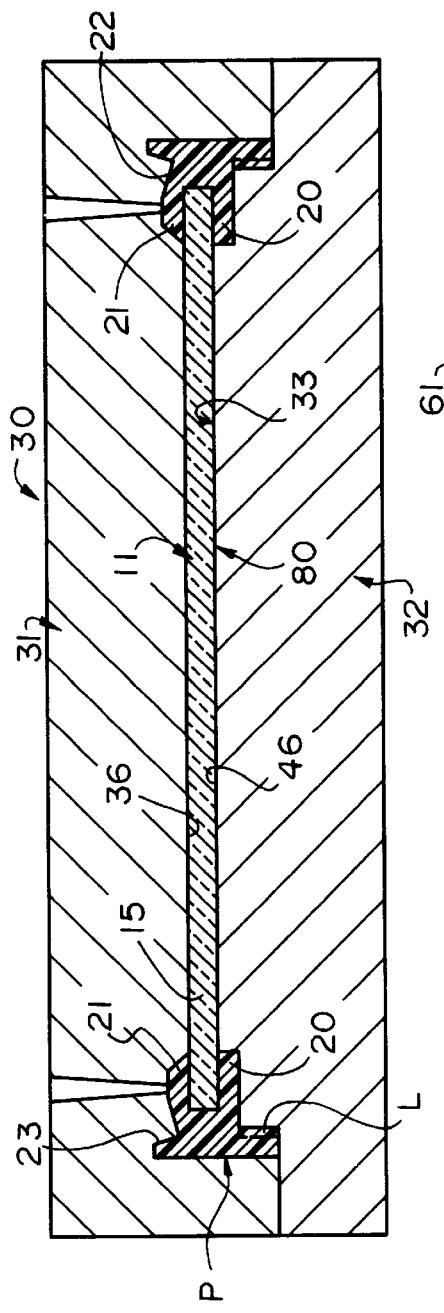
FIG. 5 is a vertical cross-sectional view of the mold of FIGS. 2 through 4, and illustrates polymeric/copolymeric material injected into the cavity and encapsulating an edge of the uni-planar glass sheet to form a continuous border, frame or encapsulation.
Figure 6:
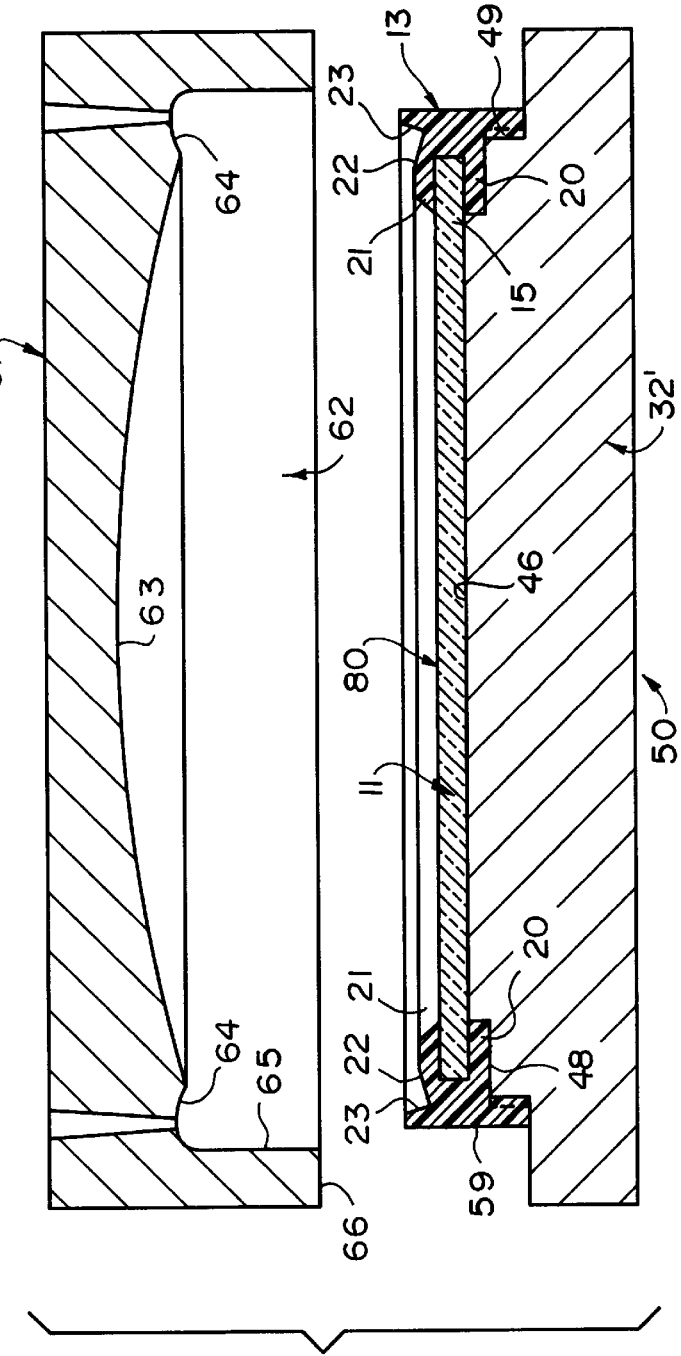
FIG. 6 is a vertical cross-sectional view taken through another injection mold of the present invention, and illustrates upper and lower bodies thereof in their open position with each defining a cavity portion which in the closed position of the mold defines a second mold cavity, and seated upon the lower mold is the peripherally encapsulated uni-planar glass sheet of FIG. 5.
Figure 9:
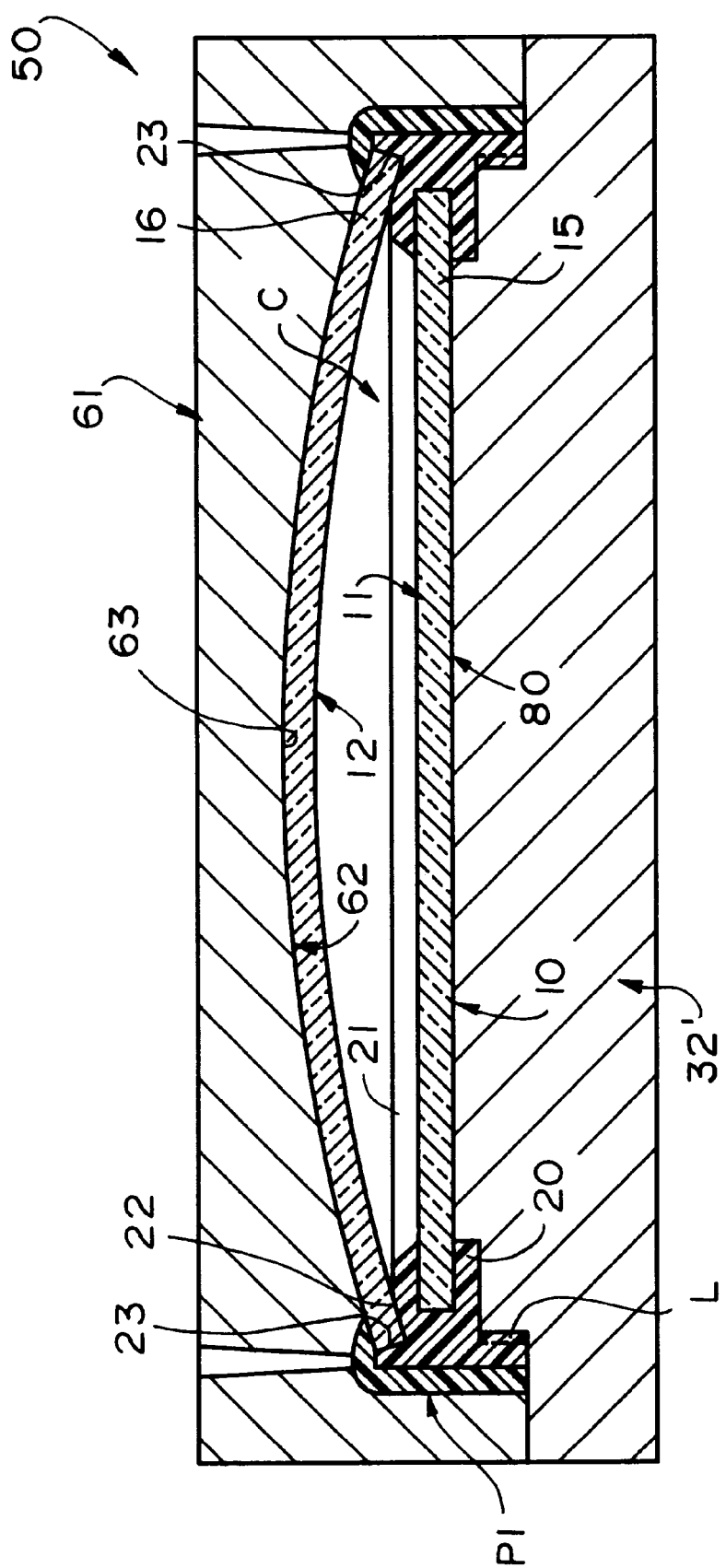
FIG. 9 is a vertical cross-sectional view of the second mold, and illustrates polymeric/copolymeric material injection molded into the second cavity to form a second peripheral encapsulation, border or frame in sealed relationship to the first encapsulation and peripheral edges of the two glass sheets to define a hermetically sealed chamber therebetween.

As is best illustrated in FIG. 5 of the drawings, synthetic polymeric/copolymeric plastic material P is injected into the peripheral cavity 35 resulting in the formation of the encapsulation, frame or border 13 which includes two peripheral radially inwardly directed flanges 20, 21 (FIG. 5) in intimate bonding sealing relationship with the peripheral edge 15 of the glass lens 11. The intermediate frusto-conical surface 40 and the outermost frusto-conical surface 41 (FIG. 4) define respective intermediate and outermost frusto-conical surfaces 22, 23 (FIG. 5) of the first encapsulation 13, as is best illustrated in FIG. 5 of the drawings. Upon solidification of the encapsulation 13, the components 11, 13 now define a unitized component 80 which, upon the opening of the mold bodies 31, 32, can remain seated upon the mold body 32 (FIG. 5) or can be withdrawn therefrom and transferred to the second mold 50 (FIGS. 6 through 9) which includes a mold body 32' essentially identical to the mold body 32. In either case, the mold body 32 or the mold body 31' of the mold 50 is associated with the component 80 in the manner shown in FIG. 6 of the drawings. The mold body 50 (FIGS. 6–9) includes for purposes of this description numerals of the lower mold body 32 which have been primed to designate its like elements and their association with another and different upper mold body 61 of the second mold 50. The upper mold body 61 of the mold 50 includes a cavity portion 62 (FIG. 6) defined by a concavo-convex centrally located surface 63 opening downwardly, as viewed in FIG. 6, an annular downwardly opening channel-shaped peripheral surface (4 and an outermost cylindrical surface 65 terminating at an annular parting surface 66.

With the mold bodies 32', 61 of the mold 50 in the open position (FIGS. 6 and 7), the concavo-convex glass sheet or lens 12 is positioned with its peripheral edge 16 in abutment with the surfaces 22, 23 of the first encapsulation 13 in the manner illustrated in FIG. 7 of the drawings. Thereafter, the mold bodies 32', 61 are closed in the manner shown in FIG. 8 which brings the concavo-convex surface 63 of the upper mold body 61 into intimate contact with the upper surface (unnumbered) of the concavo-convex glass sheet 12.

After the mold bodies 61, 32' have been closed, polymeric/copolymeric plastic material P1 (FIG. 9) is injected into a cavity 70 defined by surfaces 64, 65 and portions of the first encapsulate 13 and the peripheral edge 16 of the glass lens 12 resulting in the sealed hermetic bonding of the second encapsulate 14 (FIGS. 1 and 9) to the peripheral edge 16 of the glass lens 12 and to an exterior outer cylindrical surface 59 of the first encapsulate 13. Upon cooling and/or solidification, the mold bodies 61, 32' are opened and the sealed instrument cover 10 is ejected, inspected, packaged and shipped to end-users.

Although a preferred embodiment of the invention has been specifically illustrated and described herein, it is to be understood that minor variations may be made in the apparatus without departing from the spirit and scope of the invention, as defined the appended claims.

What is claimed is:

1. A method of forming a unitized article comprising the steps of:
   (a) encapsulating a peripheral edge portion of a first sheet with synthetic plastic material in a first mold cavity to form a first substantially peripheral border,
   (b) encapsulating a peripheral edge portion of a second sheet and at least a portion of the first border with synthetic plastic material in a second mold cavity to form a second substantially peripheral border along the second sheet peripheral edge portion and effect unitization thereof to the first border, and forming fastening means for fastening the unitized article to an associated component during the performance of one of the encapsulating steps.

2. The method as defined in claim 1 wherein the encapsulating of step (a) is performed by injection molding.

3. The method as defined in claim 1 wherein the encapsulating of step (b) is performed by injection molding.

4. The method as defined in claim 1 wherein the encapsulating of steps (a) and (b) is each performed by injection molding.

5. The method as defined in claim 1 wherein the encapsulating of step (a) is performed by injection molding hot polymeric/copolymeric synthetic plastic material into the first mold cavity substantially encompassing the first sheet peripheral edge portion.

6. The method as defined in claim 1 wherein the encapsulating of step (b) is performed by injection molding hot polymeric/copolymeric synthetic plastic material into the second mold cavity substantially encompassing the second sheet peripheral edge portion and the first border portion.

7. The method as defined in claim 1 wherein the encapsulating of step (a) is performed by injection molding hot polymeric/copolymeric synthetic plastic material into the first mold cavity substantially encompassing the first sheet peripheral edge portion, and the encapsulating of step (b) is performed by injection molding hot polymeric/copolymeric synthetic plastic material into the second mold cavity encompassing the second sheet peripheral edge portion and the first border portion.

8. The method as defined in claim 1 wherein the first sheet is glass.

9. The method as defined in claim 1 wherein the second sheet is glass.

10. The method as defined in claim 1 wherein the first and second sheets are glass.

11. The method as defined in claim 1 wherein at least one of the first and second sheets is substantially uni-planar.

12. The method as defined in claim 1 wherein at least one of the first and second sheets is substantially concavo-convex.

13. The method as defined in claim 1 wherein at least one of the first and second sheets is substantially uni-planar and the other of the first and second sheets is substantially concavo-convex.

14. The method as defined in claim 1 including the step of providing the first border with a surface configuration to effect fastening of the unitized article to an associated structural component.

15. The method as defined in claim 1 including the step of forming a chamber between the first and second sheets.

16. The method as defined in claim 1 including the step of forming a sealed chamber between the first and second sheets.

17. The method as defined in claim 1 including the step of forming a sealed chamber between the first and second sheets during the encapsulating of step (b).

18. The method as defined in claim 5 wherein the first sheet is glass.

19. The method as defined in claim 6 wherein the second sheet is glass.

20. The method as defined in claim 7 wherein the first and second sheets are glass.

21. The method as defined in claim 18 wherein at least one of the first and second sheets is substantially uni-planar.

22. The method as defined in claim 18 wherein at least one of the first and second sheets is substantially concavo-convex.

23. The method as defined in claim 18 wherein at least one of the first and second sheets is substantially uni-planar and the other of the first and second sheets is substantially concavo-convex.

24. The method as defined in claim 19 wherein at least one of the first and second sheets is substantially uni-planar.

25. The method as defined in claim 19 wherein at least one of the first and second sheets is substantially concavo-convex.

26. The method as defined in claim 19 wherein at least one of the first and second sheets is substantially uni-planar and the other of the first and second sheets is substantially concavo-convex.

27. The method as defined in claim 20 wherein at least one of the first and second sheets is substantially uni-planar.

28. The method as defined in claim 20 wherein at least one of the first and second sheets is substantially concavo-convex.

29. The method as defined in claim 20 wherein at least one of the first and second sheets is substantially uni-planar and the other of the first and second sheets is substantially concavo-convex.

30. An article of manufacture comprising at least four components, first and second of said components being sheets each having a peripheral edge portion, a third of said components including a first injection molded border portion of polymeric/copolymeric synthetic plastic material in substantially complete continuous peripherally encapsulating relationship to said first sheet peripheral edge portion, a fourth of said components including a second injection molded border portion of polymeric/copolymeric synthetic plastic material in substantially complete continuous peripherally encapsulating relationship to said second sheet peripheral edge portion and in unitized relationship to said first border portion, and a terminal edge of said second sheet being in substantial registration with a locating surface of said first injection molded border portion.

31. The article of manufacture as defined in claim 30 wherein said first sheet is glass.

32. The article of manufacture as defined in claim 30 wherein said second sheet is glass.

33. The article of manufacture as defined in claim 30 wherein said first and second sheets are each glass.

34. The article of manufacture as defined in claim 30 wherein at least one of the first and second sheets is substantially uni-planar.

35. The article of manufacture as defined in claim 30 wherein at least one of the first and second sheets is substantially concavo-convex.

36. The article of manufacture as defined in claim 30 wherein at least one of the first and second sheets is substantially uni-planar and the other of the first and second sheets is substantially concavo-convex.

37. The article of manufacture as defined in claim 30 wherein said first border portion includes means for fastening said article of manufacture to an associated structural component.

38. The article of manufacture as defined in claim 30 including means for defining a chamber between said first and second sheets.

39. The article of manufacture as defined in claim 30 including means for defining a sealed chamber between said first and second sheets.

40. The article of manufacture as defined in claim 31 wherein at least one of the first and second sheets is substantially uni-planar.

41. The article of manufacture as defined in claim 31 wherein at least one of the first and second sheets is substantially concavo-convex.

42. The article of manufacture as defined in claim 31 wherein at least one of the first and second sheets is substantially uni-planar and the other of the first and second sheets is substantially concavo-convex.

43. The article of manufacture as defined in claim 32 wherein at least one of the first and second sheets is substantially uni-planar.

44. The article of manufacture as defined in claim 32 wherein at least one of the first and second sheets is substantially concavo-convex.

45. The article of manufacture as defined in claim 32 wherein at least one of the first and second sheets is substantially uni-planar and the other of the first and second sheets is substantially concavo-convex.

46. The article of manufacture as defined in claim 33 wherein at least one of the first and second sheets is substantially uni-planar.

47. The article of manufacture as defined in claim 33 wherein at least one of the first and second sheets is substantially concavo-convex.

48. The article of manufacture as defined in claim 33 wherein at least one of the first and second sheets is substantially uni-planar and the other of the first and second sheets is substantially concavo-convex.

49. The article of manufacture as defined in claim 33 including means for defining a chamber between said first and second sheets.

50. The article of manufacture as defined in claim 34 including means for defining a chamber between said first and second sheets.

51. The article of manufacture as defined in claim 35 including means for defining a chamber between said first and second sheets.

52. The article of manufacture as defined in claim 36 including means for defining a chamber between said first and second sheets.

53. The method as defined in claim 1 including the step of molding a locating surface on the first peripheral border during the performance of step (a), and locating the second sheet peripheral edge portion in substantial registry with the locating surface prior to performing step (b).

54. The method as defined in claim 1 wherein the first and second mold cavities are each defined by at least one common mold body.

55. The method as defined in claim 1 wherein the fastening forming step is performed during the encapsulating of the first peripheral border.

56. The method as defined in claim 1 wherein the fastening forming step is performed during the encapsulating of the first peripheral border upon an internal surface thereof.

57. The method as defined in claim 1 wherein the fastening forming step is performed during the encapsulating of the first peripheral border upon an internal peripherally continuous surface thereof.

58. A method of forming a unitized article comprising the steps of providing first and second pieces of glass each having a peripheral edge, locating the first glass piece peripheral edge in a first annular cavity, injection molding hot polymeric/copolymeric synthetic plastic material into the first annular cavity to form a first annular border encapsulating the first glass piece peripheral edge, locating the second glass piece peripheral edge against the first annular border and within a second annular cavity, and injection molding hot polymeric/copolymeric synthetic plastic material into the second annular cavity to form a second annular border encapsulating the first annular border and the second glass piece peripheral edge and unitizing the last-mentioned peripheral edge and borders.

59. The method as defined in claim 58 wherein the first and second annular cavities are each defined by at least one common mold body.

60. The method as defined in claim 58 including the step of molding a locating surface on the first peripheral border during the encapsulating thereof, and locating the second glass piece peripheral edge against the locating surface prior to encapsulating the second glass piece peripheral edge.

61. The article of manufacture as defined in claim 30 including fastening means defined by one of said border portions for fastening the article to an associated component.

62. The article of manufacture as defined in claim 61 wherein said one border portion is said first injection molded border portion.

63. The article of manufacture as defined in claim 61 wherein said one border portion is said first injection molded border portion, and said first injection molded border portion includes a continuous periphery carrying said fastening means.

64. The article of manufacture as defined in claim 61 wherein said one border portion is said first injection molded border portion, and said first injection molded border portion includes a continuous periphery carrying said fastening means upon an internal peripheral surface thereof.

* * * * *